US011247362B2

(12) United States Patent
Sterling et al.

(10) Patent No.: US 11,247,362 B2
(45) Date of Patent: Feb. 15, 2022

(54) CIRCULAR SAW BLADE

(71) Applicant: Sterling Site Access Solutions, LLC., Phoenix, IL (US)

(72) Inventors: Carter Sterling, Palos Park, IL (US); John Rake, Chicago, IL (US); Sean Hedden, Glen Ellyn, IL (US); Michael Janociak, Woodridge, IL (US)

(73) Assignee: STERLING SITE ACCESS SOLUTIONS, Phoenix, IL (US)

( * ) Notice: Subject to any disclaimer, the term of this patent is extended or adjusted under 35 U.S.C. 154(b) by 78 days.

(21) Appl. No.: 16/797,576

(22) Filed: Feb. 21, 2020

(65) Prior Publication Data
US 2020/0269460 A1 Aug. 27, 2020

Related U.S. Application Data

(60) Provisional application No. 62/809,270, filed on Feb. 22, 2019.

(51) Int. Cl.
*B27B 33/08* (2006.01)
*B27D 5/00* (2006.01)

(52) U.S. Cl.
CPC ............. *B27B 33/08* (2013.01); *B27D 5/006* (2013.01)

(58) Field of Classification Search
CPC ......... B27B 33/08; B27B 33/12; B27B 33/20; B27G 13/08; B27G 13/10
See application file for complete search history.

(56) References Cited

U.S. PATENT DOCUMENTS 1,541,034 A * 6/1925 Edmond ................. B27B 33/20
144/223
2,411,784 A 11/1946 Goldsmith et al.
(Continued)

FOREIGN PATENT DOCUMENTS

| CN | 107617775 A | 1/1989 |
| DE | 197 08 686 A1 | 8/1998 |
| WO | 2014131403 | 9/2014 |

OTHER PUBLICATIONS

Web Page for Cut Bevel Blade (PC P400) ;Exact Pipe Tools, Inc.; Dec. 11, 2018; 1 page.
(Continued)

*Primary Examiner* — Matthew Katcoff
(74) *Attorney, Agent, or Firm* — Vedder Price P.C.

(57) ABSTRACT

The present disclosure is directed towards an Improved Circular Saw Blade for simultaneous and combination cutting and chamfering a workpiece comprising a modified circular saw blade configured as a primary cutter to be mounted to one end of an arbor shaft rotatable on an axis. The modified circular saw blade comprises a plurality of substantially identical slots spaced circumferentially and extending radially inward towards the center. A modified chamfer tool is then configured as a secondary cutter to be aligned and mounted coaxially behind the primary cutter on the arbor shaft. The modified chamfer tool comprises angularly disposed peripheral chamfer blades mounted in the slots of the primary cutter so as to be displaceable transversely to the longitudinal axis of the modified circular saw blade. During manufacturing operations the peripheral chamfer blades of the secondary cutter are configured to follow the path of the primary cutter for simultaneously cutting and chamfering of the workpiece to a certain desired length and angle, respectively.

21 Claims, 4 Drawing Sheets

(56) References Cited

U.S. PATENT DOCUMENTS

| | | | |
|---|---|---|---|
| 3,730,038 A | 5/1973 | Farb | |
| 4,641,562 A | 2/1987 | Clarke | |
| 4,677,886 A | 7/1987 | Neu | |
| 4,794,836 A | 1/1989 | Villani | |
| 4,907,920 A | 3/1990 | Lund et al. | |
| 5,303,754 A * | 4/1994 | Rautio | B27B 33/20 144/237 |
| 6,129,488 A | 10/2000 | Fischer | |
| 6,739,227 B2 | 5/2004 | Thompson | |
| 7,770,616 B2 * | 8/2010 | Gross | B27L 11/007 144/39 |
| 11,034,048 B2 * | 6/2021 | Kvarnstrand | B27G 13/005 |
| 2013/0196578 A1 | 8/2013 | Arias Sucarrats | |

OTHER PUBLICATIONS

Web Page for Rhinotron Saw Blade for Tube Cutting (SAWS2032); Rhinotron; Dec. 11, 2018; 4 pages.

Web Page for TCT Circular Saw Blades for Multi-rip Machines (94); Pilana; Dec. 11, 2018; 6 pages.

* cited by examiner

CIRCULAR SAW BLADE

CROSS REFERENCE TO RELATED APPLICATION

This application claims priority to U.S. Provisional Application No. 62/809,270 filed on Feb. 22, 2019, the content of which is hereby incorporated by reference.

FIELD OF THE DISCLOSURE

The present invention is directed towards overcoming the disadvantages and problems associated with manufacturing operations that require the combined cutting and chamfering of a workpiece. The present invention generally relates to a machining tool comprising an Improved Circular Saw Blade capable of combining the cutting and chamfering in one manufacturing operation of workpieces such as lumber panels. More specifically, the present invention is directed towards an Improved Circular Saw Blade with apertures used in combination with a modified chamfer cutting tool (the "Improved Circular Saw Blade" or "ICSB").

BACKGROUND OF THE INVENTION

A circular saw blade has been used for decades in manufacturing as a portable cutting device. A circular saw blade is generally employed as a rotating, continuous cutting blade having teeth on its periphery to cut to required length ferrous and nonferrous metals, plastic, and other materials such as lumber panels made of wood. During manufacturing operations, it is common to chamfer the edge of a workpiece in a combined operation after a workpiece has been cut to the desired length by a commercially available circular saw blade or similar cutting tool.

However, experience has shown that such manufacturing practices requiring chamfering with the cutting is time-consuming and costly and can be extremely inefficient for repetitive operations in high-volume production. Further, higher temperatures generated in such combined cutting and chamfering operation can be detrimental to machining operations, and the life and performance of the tools (and products/machines) are greatly affected by heat generated during such manufacturing operations.

Therefore, the current state of cutting and chamfering during manufacturing operation—primary cutting of the workpiece combined with chamfering (using a standard chamfer tool) is difficult to accomplish in an efficient and economical fashion. One factor in the life of a tool is the temperature of the tool generated during cutting/chamfering of a workpiece. A higher tool temperature will result in a shorter useful life of a tool.

Specifically, the temperature generated during such manufacturing/machining operation has a direct effect on the performance and longevity of the various tools used (e.g., an arbor) and impacts the quality of the finished product. Such inefficiencies are clearly detrimental to a high-volume manufacturer. Obviously, it is desirable to lengthen the life of a tool in manufacturing operations. Longer tool life leads to better financial outcome for a manufacturer—at a minimum—lower operating costs and better machine efficiency. The novelty and utility of the devices and related methods and systems described in the present disclosure provides novel improvements while overcoming the disadvantages of existing tools and processes for cutting and chamfering.

Therefore, there is a need in the marketplace to provide an Improved Circular Saw Blade configured for combined cutting and chamfering while—at the same time—overcoming the deficiencies and drawbacks of currently available tools and processes. That is, in order to perform the combined cutting and chamfering operation, an Improved Circular Saw Blade is provided comprising of a primary modified circular saw blade in combination with a secondary modified chamfer tool rigidly attached through the apertures of the modified circular saw blade. One of the primary objectives of this invention is to provide an efficient combination tool comprising an Improved Circular Saw Blade capable of cutting and chamfering in one (combined) manufacturing operation.

In one aspect of the present disclosure, the Improved Circular Saw Blade includes a commercially available circular saw blade modified by the machining of a plurality of circumferentially located, radially inward-directed slots. A commercially available chamfer tool is then modified and engaged adjacent to the modified circular saw blade such that the combination tool comprises an Improved Circular Saw Blade capable of cutting and chamfering in one manufacturing operation. The plurality of heat-reducing circumferentially located apertures disposed radially within the Improved Circular Saw Blade reduces the buildup of heat generated in such combination cutting and chamfering.

Major benefits of the Improved Circular Saw Blade include high production capacity, increased efficiencies from better economies of scale, increased tool life and better-quality finished product. In addition, the Improved Circular Saw Blade can decrease labor costs and improve the efficiency in the changeover time (or production cycle) for different-sized workpieces, thereby making the manufacturing process fast and economical for both small-lot sizes and high-volume production.

SUMMARY

Accordingly, it is an object of this present invention to provide a combined cutting and chamfering tool that enables one to cut and chamfer a workpiece in a single manufacturing operation. Therefore, an improved combination tool is advantageously formed, distinguished by its efficient method of operation from using the Improved Circular Saw Blade. Embodiments disclosed in the present application provide such Improved Circular Saw Blade.

In an aspect of the present disclosure, an Improved Circular Saw Blade for simultaneous cutting and chamfering a workpiece comprises a modified circular saw blade configured as a primary cutter to be mounted to one end of an arbor shaft rotatable on an axis, the modified circular saw blade having a plurality of substantially identical slots spaced circumferentially and extending radially inward towards the center. A modified chamfer tool configured as a secondary cutter is aligned and mounted coaxially in combination with the primary cutter on the arbor shaft for combination cutting and chamfering.

In yet another aspect of the present disclosure, the modified chamfer comprises angularly disposed peripheral chamfer blades mounted in the slots of the primary cutter so as to be displaceable transversely to the longitudinal axis of the Improved Circular Saw Blade configured with the combination capability of cutting and chamfering in one manufacturing operation.

In still yet another aspect of the present disclosure, during manufacturing operation the peripheral chamfer blades of the secondary cutter are configured to follow the path of the primary cutter for cutting and chamfering in one manufacturing operation of the workpiece to a certain desired length and angle, respectively.

In another aspect of the present disclosure, the peripheral chamfer blades of the modified chamfer tool are disposed in respective angular relationship to the longitudinal axis of the modified circular saw blade to provide a predetermined chamfer cutting angle for the workpiece.

In yet another aspect of the present disclosure, the secondary cutter has an overall diameter that is less than the diameter of the primary cutter.

In still yet another aspect of the present disclosure, the modified chamfer tool has at least four peripheral chamfer blades.

In another aspect of the present disclosure, the peripheral chamfer blades of the secondary cutter are centrally aligned with the plurality of symmetrically arranged and radially extending slots of the primary cutter.

In yet another aspect of the present disclosure, the workpiece is a lumber panel comprising a varied combination of hardwood and/or softwood species.

In another aspect of the present disclosure, a 14-inch modified chamfer tool is used with the modified circular saw blade to produce the desired width cut length ranging from a minimum of 0.2350 Kerf to a maximum of 0.2450 Kerf.

In an aspect of the present disclosure, the peripheral chamfer blades of the secondary cutter are configured to radially advance while revolving to effect a simultaneous and improved combination cutting and chamfering operation on the workpiece.

In an aspect of the present disclosure, a method of using an Improved Circular Saw Blade for combination cutting and chamfering a workpiece, comprises the steps of: (1) mounting a modified circular saw blade configured as a primary cutter to one end of an arbor shaft rotatable on an axis, the modified circular saw blade having a plurality of substantially identical slots spaced circumferentially and extending radially inward towards the center; (2) aligning and mounting a modified chamfer tool configured as a secondary cutter coaxially behind the primary cutter on the arbor shaft, the modified chamfer tool having angularly disposed peripheral chamfer blades mounted in the slots of the primary cutter so as to be displaceable transversely to the longitudinal axis of the modified saw blade; (3) advancing the Improved Circular Saw Blade towards the workpiece during a manufacturing operation; and (4) engaging the workpiece with the Improved Circular Saw Blade for simultaneously cutting and chamfering the edges of the workpiece to a certain desired length and angle, respectively.

In yet another aspect of the present disclosure, during the combination cutting and chamfering of the workpiece, the peripheral chamfer blades are disposed in respective angular relationship to the longitudinal axis of the modified circular saw blade to provide a predetermined chamfer cutting angle for the workpiece.

In still yet another aspect of the present disclosure, during the combination cutting and chamfering of the workpiece, the peripheral chamfer blades are disposed in respective angular relationship to the longitudinal axis of the modified circular saw blade to provide a predetermined chamfer cutting angle for the workpiece.

In still yet another aspect of the present disclosure, during the combination cutting and chamfering of the workpiece, the secondary cutter has an overall diameter that is less than the diameter of the primary cutter.

In still yet another aspect of the present disclosure, during the combination cutting and chamfering of the workpiece, the modified chamfer tool has at least four peripheral chamfer blades.

In still yet another aspect of the present disclosure, during the combination cutting and chamfering of the workpiece, the peripheral chamfer blades of the secondary cutter are centrally aligned with the plurality of symmetrically arranged and radially extending slots of the primary cutter.

In another aspect of the present disclosure, during the combination cutting and chamfering of the workpiece, the workpiece is a lumber panel comprising a varied combination of hardwood and/or softwood species.

In still yet another aspect of the present disclosure, during the combination cutting and chamfering of the workpiece, a 14-inch modified chamfer tool is used with the modified circular saw blade to produce the desired width cut length ranging from a minimum of 0.2350 Kerf to a maximum of 0.2450 Kerf.

In still yet another aspect of the present disclosure, during the combination cutting and chamfering of the workpiece, the peripheral chamfer blades of the secondary cutter are configured to radially advance while revolving to effect a simultaneous cutting and chamfering operation on the workpiece.

In an aspect of the present disclosure, a system of using an Improved Circular Saw Blade for simultaneous and combination cutting and chamfering a workpiece is provided, the system comprising: (a) an arbor having a rotatable shaft connected to a motor of a milling machine, a collar mounted on the arbor shaft; (b) mounting a modified circular saw blade on one end of the shaft adjacent to the collar as a primary cutter, the modified circular saw blade having a plurality of substantially identical slots spaced circumferentially and extending radially inward towards the center; (c) aligning and mounting a modified chamfer tool configured as a secondary cutter coaxially behind the primary cutter on the arbor shaft, the modified chamfer tool having angularly disposed peripheral chamfer blades mounted in the slots of the primary cutter so as to be displaceable transversely to the longitudinal axis of the modified saw blade, a spacer and a nut mounted on the opposite side of the modified chamfer tool to hold the Improved Circular Saw Blade in position; (d) advancing the Improved Circular Saw Blade towards the workpiece during a manufacturing operation; and (e) engaging the workpiece with the Improved Circular Saw Blade for simultaneously cutting and chamfering the edges of the workpiece to a certain desired length and angle, respectively.

In yet another aspect of the present disclosure, the system of the combination cutting and chamfering of the workpiece further comprises peripheral chamfer blades that are disposed in respective angular relationship to the longitudinal axis of the modified circular saw blade to provide a predetermined chamfer cutting angle for the workpiece.

In yet another aspect of the present disclosure, the system of the combination cutting and chamfering of the workpiece further comprises a secondary cutter—the modified chamfer tool—that has an overall diameter that is less than the diameter of the primary cutter.

In yet another aspect of the present disclosure, the system of the combination cutting and chamfering of the workpiece further comprises a modified chamfer tool that has at least four peripheral chamfer blades.

In still yet another aspect of the present disclosure, the system of the combination cutting and chamfering of the workpiece further comprises peripheral chamfer blades of the secondary cutter centrally aligned with the plurality of symmetrically arranged and radially extending slots of the primary cutter.

In still yet another aspect of the present disclosure, the system of the combination cutting and chamfering of the workpiece further comprises a workpiece such as a lumber panel comprising a varied combination of hardwood and/or softwood species.

In still yet another aspect of the present disclosure, the system of the combination cutting and chamfering of the workpiece further comprises a 14-inch modified chamfer tool used with the modified circular saw blade to produce the desired width cut length ranging from a minimum of 0.2350 Kerf to a maximum of 0.2450 Kerf.

| 14" w/strobes and chamfer holes | |
|---|---|
| | SPEC |
| Blade Body | 0.1650 |
| Max. Kerf | 0.2450 |
| Min. Kerf | 0.2350 |
| TTB Max | 0.0400 |
| TTB Min. | 0.0350 |
| Evenness of TTB side to side | .005 Max |
| Strobes (carbide tipped and sharpened) | As needed |

In still yet another aspect of the present disclosure, the system of the combination cutting and chamfering of the workpiece further comprises peripheral chamfer blades of the secondary cutter that are configured to radially advance while revolving to effect simultaneous and combination cutting and chamfering operation on the workpiece.

In another aspect of the present disclosure, during manufacturing operation, lumber panels or other similar workpieces are fed into the Improved Circular Saw Blade for a combination operation of discharging measured lengths of finished lumber panels with chamfered ends. Controls are also provided for manually effecting one or more of the desired operations as needed.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION OF THE INVENTION

Figure 1:
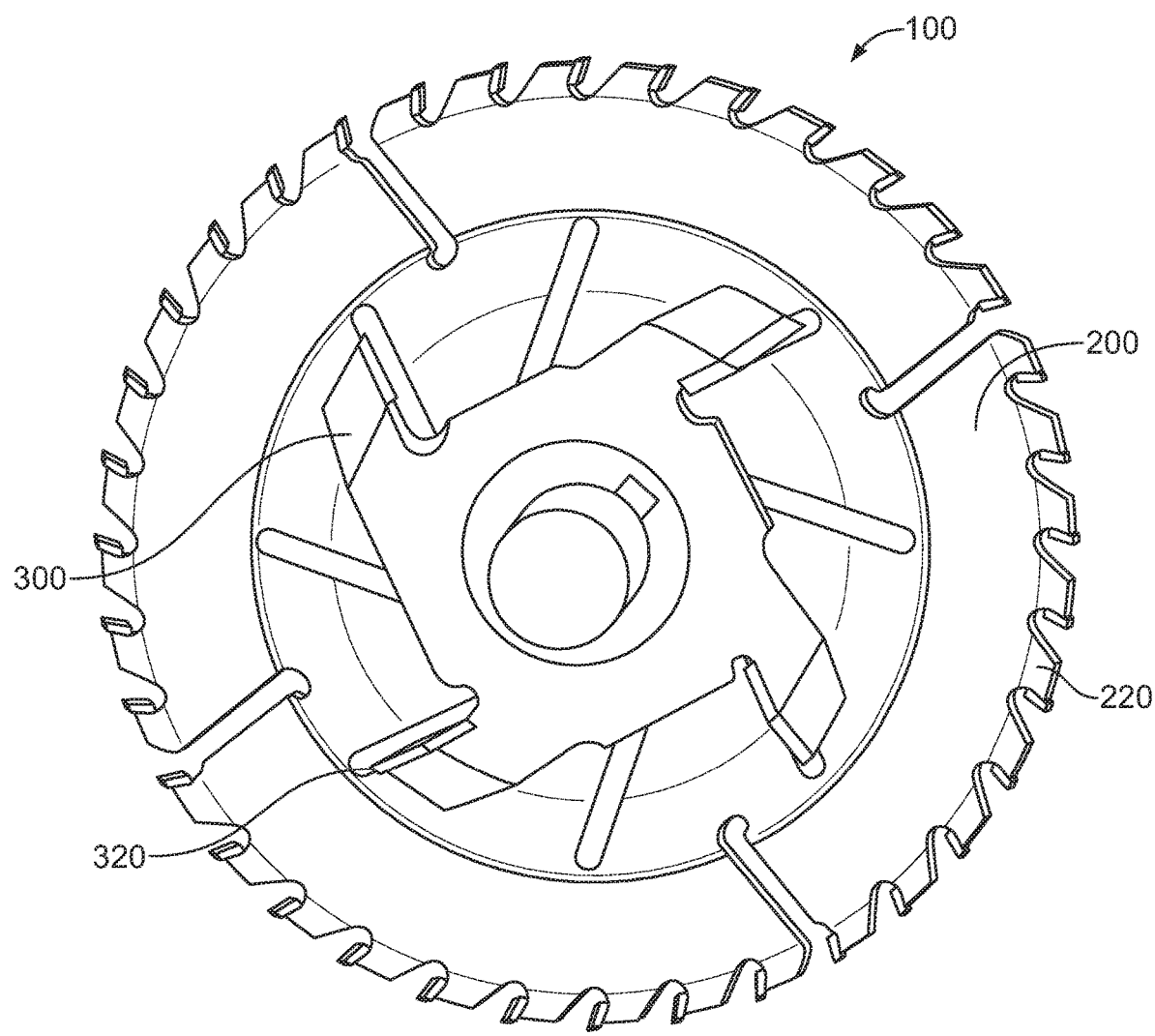
FIG. 1 is a front view of an Improved Circular Saw Blade, having a combination of a modified circular saw blade and a modified chamfer tool in accordance with the invention.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices, methods and systems and such further applications of the principles disclosed and illustrated herein are contemplated as would normally occur to one of skill in the art to which this disclosure relates.

The following disclosure as a whole may be best understood by reference to the provided detailed description when read in conjunction with the accompanying drawings, drawing description, abstract, background, field of the disclosure and associated headings. Identical reference numerals, when found on different figures, identify the same elements or a functionally equivalent element. The elements listed in the abstract are not referenced but nevertheless refer by association to the elements of the detailed description and associated disclosure.

FIG. 1 illustrates an Improved Circular Saw Blade 100 designed as a combination tool, which consists of a modified circular saw blade 200 and a modified chamfer tool 300 placed adjacent to the modified circular saw blade 200 and radially mounted on a shaft. The modified chamfer tool 300 is mounted adjacent to the surface of the modified circular saw blade 200.

Figure 2:
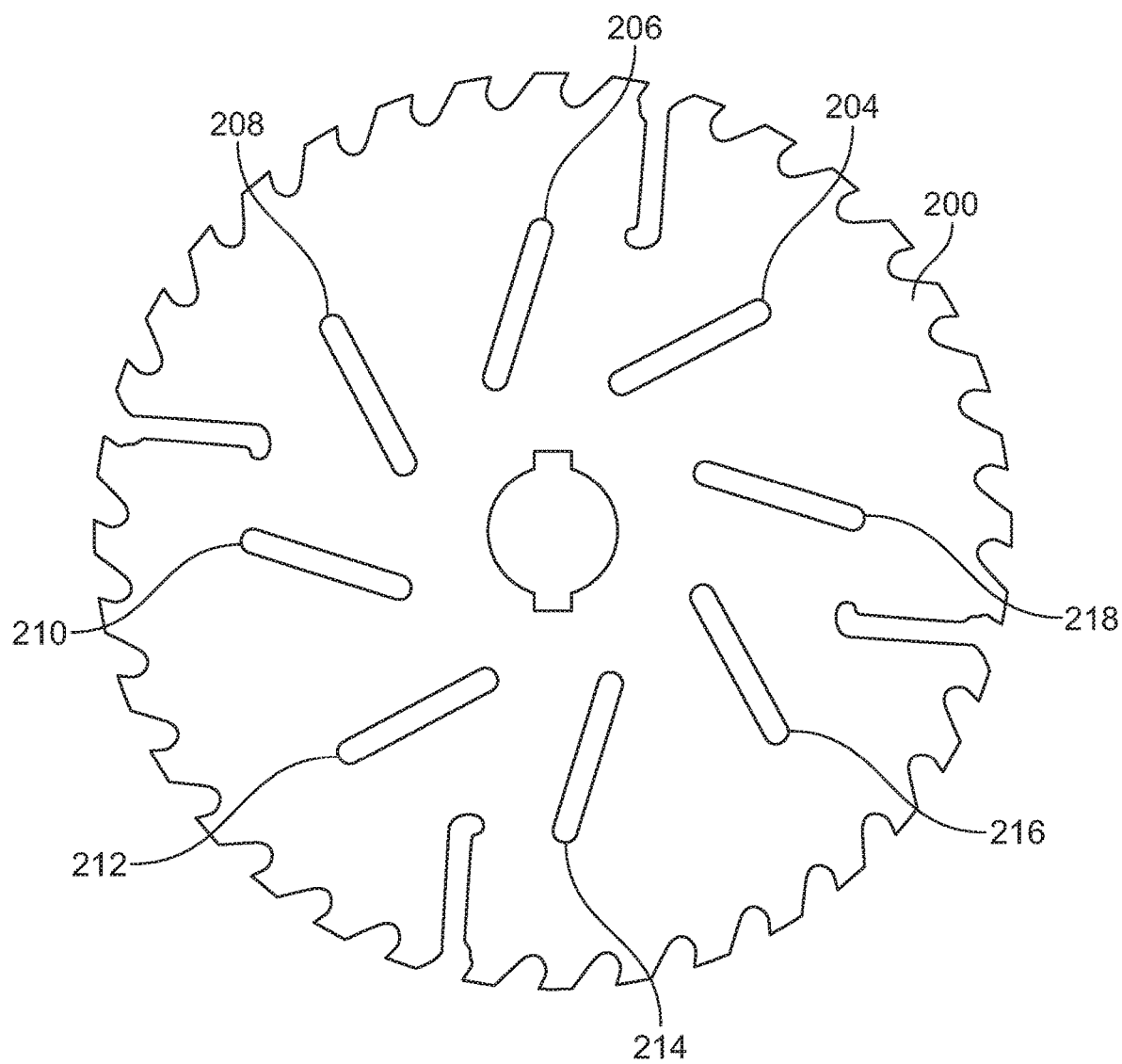
FIG. 2 is a front view of the modified circular saw blade in accordance with the invention.

Turning to FIG. 2, the Improved Circular Saw Blade 100 includes a plurality of symmetrically arranged apertures 204 through 218.

Figure 3:
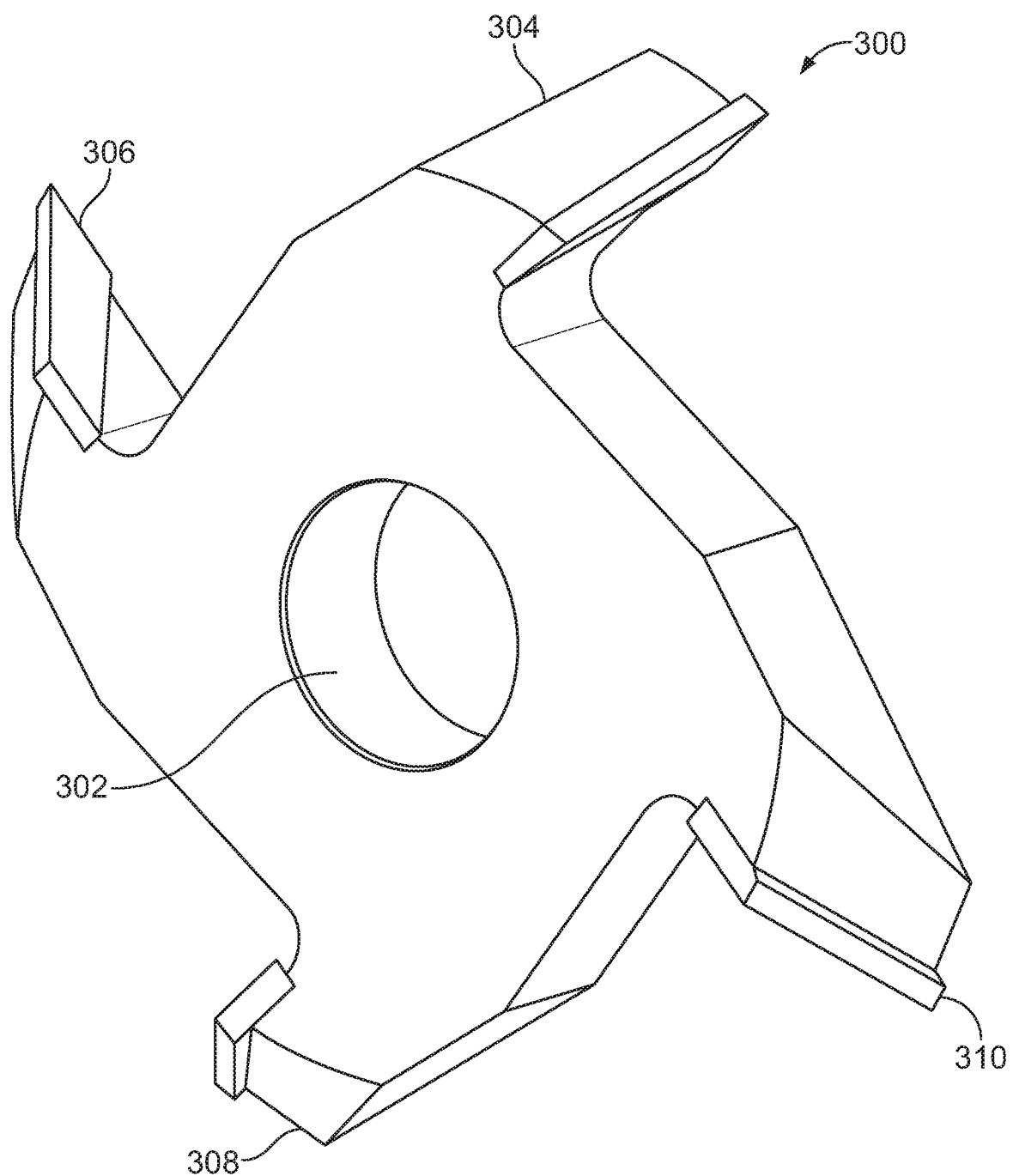
FIG. 3 is a perspective view of the modified four-lobe chamfer tool in accordance with the invention.

Turning to FIG. 3, a modified chamfer tool 300 has a through-hole 302 and includes four peripheral chamfer blades 304, 306, 308 and 310.

As further illustrated in FIGS. 1-3, the diameter 220 of the modified circular saw blade 200 should be greater than the diameter 320 of the modified chamfer tool to ensure efficient combined cutting and chamfering function of the workpiece.

The peripheral chamfer blades 304, 306, 308 and 310 of the modified chamfer tool 300 will be aligned with the plurality of symmetrically arranged apertures 204 through 218 of the modified circular saw blade 200.

Figure 4:
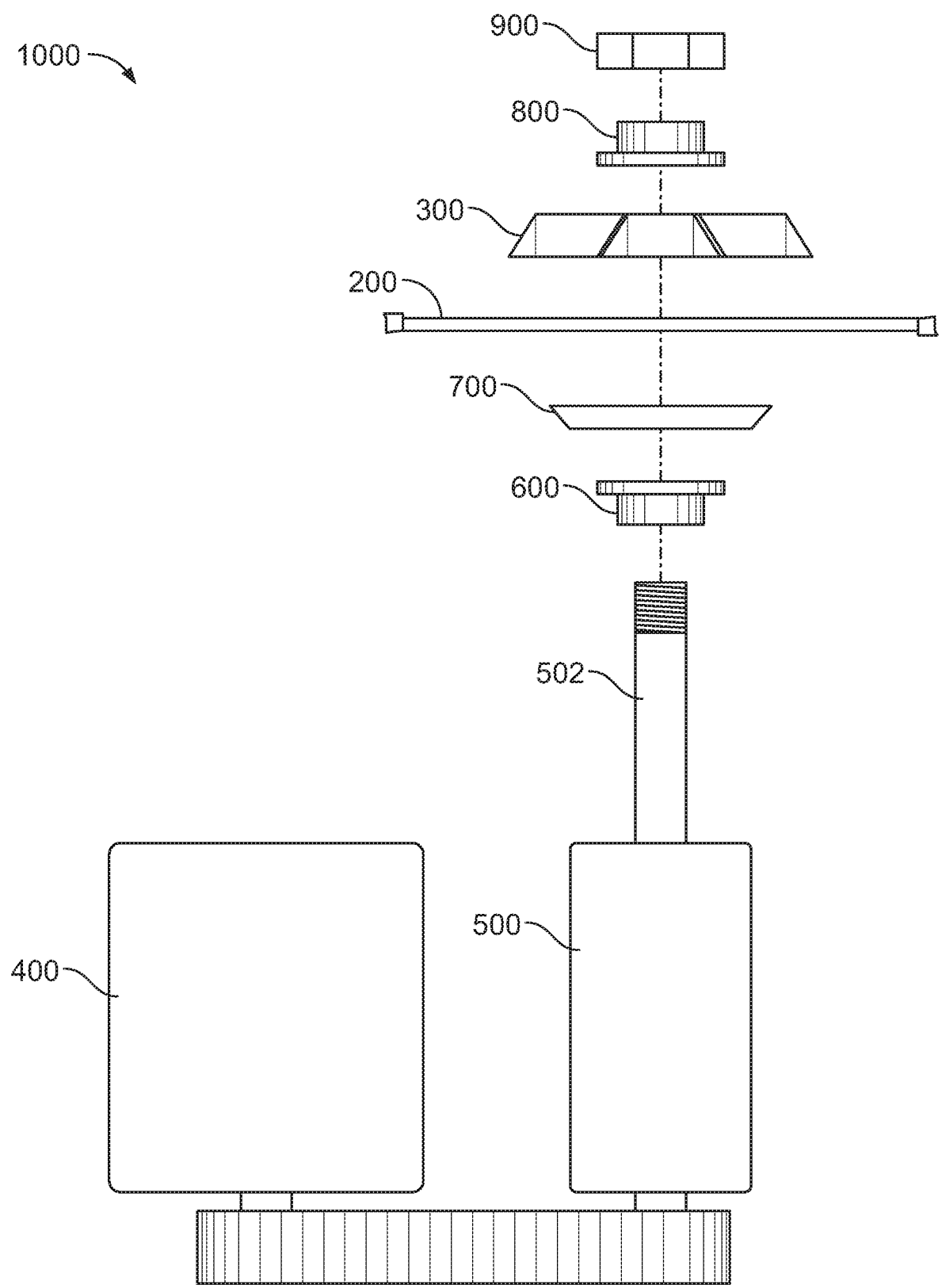
FIG. 4 is the top view of the Improved Circular Saw Blade mounted on an arbor shaft, having a combination of a modified circular saw blade and a modified chamfer tool in accordance with the invention, as used during manufacturing operations.

As will be appreciated by one of ordinary skill in the art, the Improved Circular Saw Blade 100 and the modified chamfer tool 300, along with other parts, are shown as a completed assembly 1000 as they exist during manufacturing operations. As illustrated in FIG. 4, a spacer 600 and a collar 700 are mounted on a shaft/spindle 502 of an arbor 500 connected to a motor 400.

The Improved Circular Saw Blade 100 and the modified chamfer tool 300 are mounted adjacent to the collar 700 of the shaft/spindle 502 of an arbor 500. A spacer 800 and a nut 900 are mounted adjacent to the modified chamfer tool 300 to complete the assembly 1000.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention but to provide sufficient disclosure to allow one of ordinary skill in the art to practice the invention without undue burden. It is further understood that the scope of the present invention fully encompasses other embodiments that may become obvious to those skilled in the art and that the scope of the present invention is accordingly not limited by the embodiment disclosed herein.

Those skilled in the art will appreciate that changes and additions may be made without departing from the instant teachings. For example, the teachings of the instant disclosure may be directed to various combinations and subcombinations of the disclosed features and/or combinations and sub-combinations of several features as described herein. It is therefore contemplated that any and all modifications, variations and equivalents of the above-described teachings fall within the scope of the basic underlying principles disclosed above and claimed herein.

All references cited herein are hereby incorporated by reference to the same extent as if each reference were individually and specifically indicated to be incorporated by reference and were set forth in its entirety herein.

The use of the terms "a", "an" and "the" and similar referents in the context of describing the invention (especially in the context of the following claims) is to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description.

The above-detailed description and the examples described therein have been presented for the purposes of illustration and description only and not by limitation. It is therefore contemplated that the present disclosure covers any and all modifications, variations and equivalents that fall within the spirit and scope of the basic underlying principles disclosed above and claimed herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An Improved Circular Saw Blade for simultaneous cutting and chamfering a workpiece, the Improved Circular Saw Blade comprising:
   a modified circular saw blade configured as a primary cutter to be mounted to one end of an arbor shaft rotatable on an axis, the modified circular saw blade having a plurality of substantially identical slots spaced circumferentially and extending radially inward towards the center;
   a modified chamfer tool configured as a secondary cutter to be aligned and mounted coaxially behind the primary cutter on the arbor shaft;
   the modified chamfer tool having angularly disposed peripheral chamfer blades mounted in the slots of the primary cutter so as to be displaceable transversely to the longitudinal axis of the modified circular saw blade; wherein the peripheral chamfer blades of the secondary cutter are disposed at an oblique angle with respect to its axis and centrally aligned with the plurality of symmetrically arranged and radially extending closed slots of the primary cutter; and
   wherein during manufacturing operations the peripheral chamfer blades of the secondary cutter are configured to follow the path of the primary cutter for simultaneously cutting and chamfering the edges of the workpiece to a certain desired length and angle, respectively.

2. The Improved Circular Saw Blade of claim 1, wherein the peripheral chamfer blades are disposed in respective angular relationship to the longitudinal axis of the modified circular saw blade to provide a predetermined chamfer cutting angle for the workpiece.

3. The Improved Circular Saw Blade of claim 1, wherein the secondary cutter has an overall diameter that is less than the diameter of the primary cutter.

4. The Improved Circular Saw Blade of claim 1, wherein the modified chamfer tool has at least four peripheral chamfer blades.

5. The Improved Circular Saw Blade of claim 1, wherein the workpiece is a lumber panel comprising a varied combination of hardwood and/or softwood species.

6. The Improved Circular Saw Blade of claim 1, wherein a 14-inch modified chamfer tool is used with the modified circular saw blade to produce the desired width cut length ranging from a minimum of 0.2350 Kerf to a maximum of 0.2450 Kerf.

7. The Improved Circular Saw Blade of claim 1, wherein the peripheral chamfer blades of the secondary cutter are configured to radially advance while revolving to effect simultaneous cutting and chamfering operation on the workpiece.

8. A method of using an Improved Circular Saw Blade for simultaneous cutting and chamfering a workpiece, the method comprising the steps of:
   mounting a modified circular saw blade configured as a primary cutter to one end of an arbor shaft rotatable on an axis, the modified circular saw blade having a plurality of substantially identical slots spaced circumferentially and extending radially inward towards the center;
   aligning and mounting a modified chamfer tool configured as a secondary cutter coaxially behind the primary cutter on the arbor shaft, the modified chamfer tool having angularly disposed peripheral chamfer blades mounted in the slots of the primary cutter so as to be displaceable transversely to the longitudinal axis of the modified saw blade; wherein the peripheral chamfer blades of the secondary cutter are disposed at an oblique angle with respect to its axis and centrally aligned with the plurality of symmetrically arranged and radially extending closed slots of the primary cutter;
   advancing the Improved Circular Saw Blade towards the workpiece during a manufacturing operation; and
   engaging the workpiece with the Improved Circular Saw Blade for simultaneously cutting and chamfering the edges of the workpiece to a certain desired length and angle, respectively.

9. The method of claim 8, wherein the peripheral chamfer blades are disposed in respective angular relationship to the longitudinal axis of the modified circular saw blade to provide a predetermined chamfer cutting angle for the workpiece.

10. The method of claim 8, wherein the secondary cutter has an overall diameter that is less than the diameter of the primary cutter.

11. The method claim 8, wherein the modified chamfer tool has at least four peripheral chamfer blades.

12. The method of claim 8, wherein the workpiece is a lumber panel comprising a varied combination of hardwood and/or softwood species.

13. The method of claim 8, wherein a 14-inch modified chamfer tool is used with the modified circular saw blade to produce the desired width cut length ranging from a minimum of 0.2350 Kerf to a maximum of 0.2450 Kerf.

14. The method of claim 8, wherein the peripheral chamfer blades of the secondary cutter are configured to radially advance while revolving to effect simultaneous cutting and chamfering operation on the workpiece.

15. A system of simultaneous cutting and chamfering a workpiece using an Improved Circular Saw Blade, the system comprising:

an arbor having a rotatable shaft connected to a motor of a milling machine, a collar mounted on the arbor shaft;

mounting a modified circular saw blade on one end of the shaft adjacent to the collar as a primary cutter, the modified circular saw blade having a plurality of substantially identical slots spaced circumferentially and extending radially inward towards the center;

aligning and mounting a modified chamfer tool configured as a secondary cutter coaxially behind the primary cutter on the arbor shaft, the modified chamfer tool having angularly disposed peripheral chamfer blades mounted in the slots of the primary cutter so as to be displaceable transversely to the longitudinal axis of the modified saw blade, wherein the peripheral chamfer blades of the secondary cutter are disposed at an oblique angle with respect to its axis and centrally aligned with the plurality of symmetrically arranged and radially extending closed slots of the primary cutter, a spacer and a nut mounted on the opposite side of the modified chamfer tool to hold the Improved Circular Saw Blade in position;

advancing the Improved Circular Saw Blade towards the workpiece during a manufacturing operation; and engaging the workpiece with the Improved Circular Saw Blade for simultaneously cutting and chamfering the edges of the workpiece to a certain desired length and angle, respectively.

16. The system of claim 15, wherein the peripheral chamfer blades are disposed in respective angular relationship to the longitudinal axis of the modified circular saw blade to provide a predetermined chamfer cutting angle for the workpiece.

17. The system of claim 15, wherein the secondary cutter has an overall diameter that is less than the diameter of the primary cutter.

18. The system of claim 15, wherein the modified chamfer tool has at least four peripheral chamfer blades.

19. The system of claim 15, wherein the workpiece is a lumber panel comprising a varied combination of hardwood and/or softwood species.

20. The system of claim 15, wherein a 14-inch modified chamfer tool is used with the modified circular saw blade to produce the desired width cut length ranging from a minimum of 0.2350 Kerf to a maximum of 0.2450 Kerf.

21. The system of claim 15, wherein the peripheral chamfer blades of the secondary cutter are configured to radially advance while revolving to effect simultaneous cutting and chamfering operation on the workpiece.

* * * * *